Figure 4:
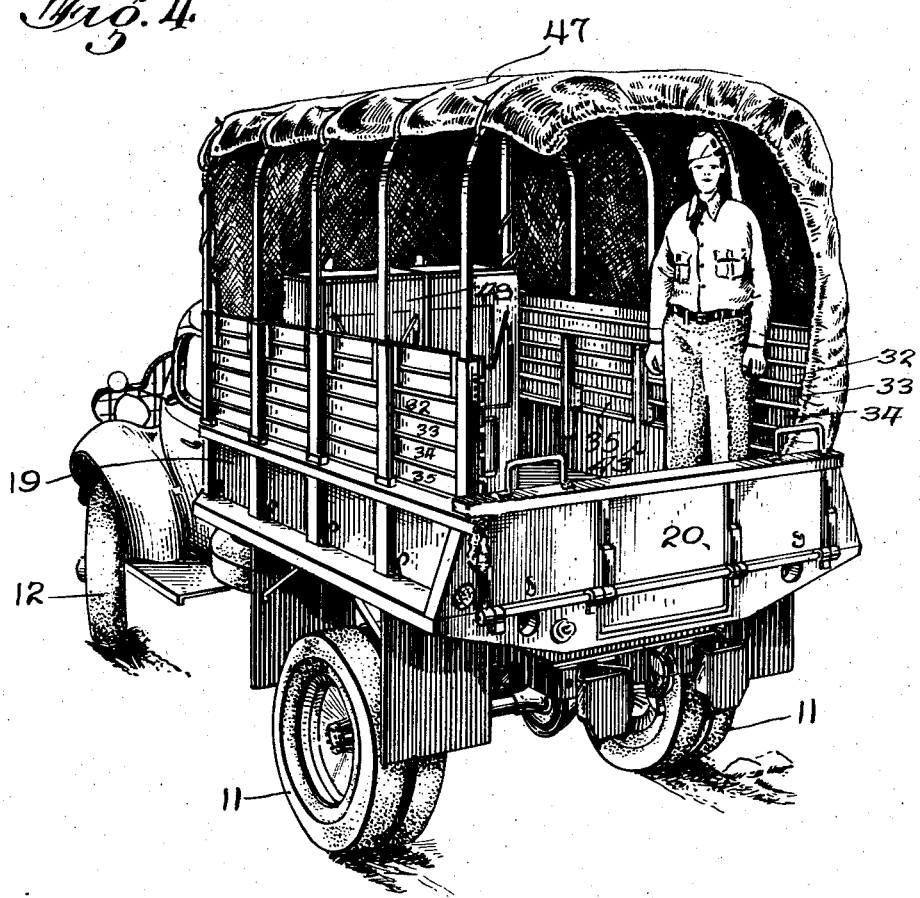

July 20, 1943. W. B. JOHNSON 2,324,508
MILITARY VEHICLE BODY
Filed March 21, 1942 3 Sheets-Sheet 1
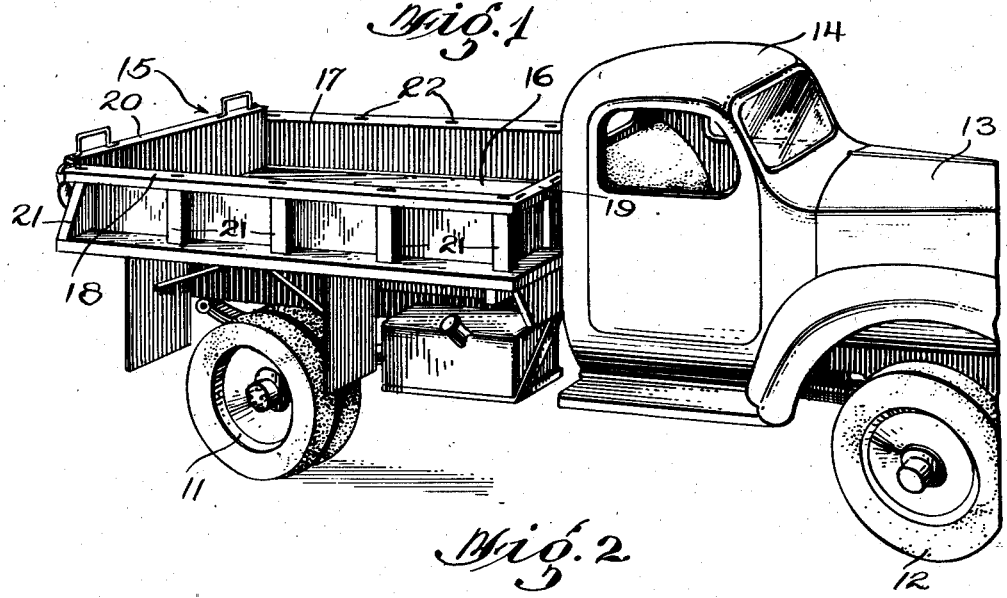
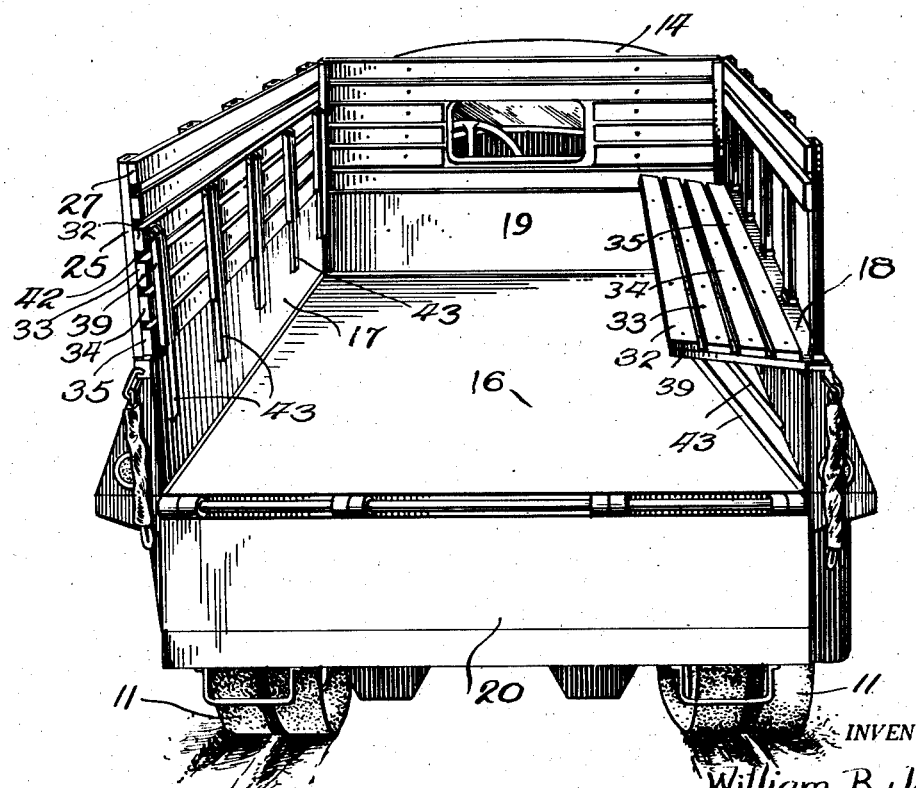
INVENTOR.
BY William B. Johnson
L. F. Hammond
ATTORNEY July 20, 1943.  W. B. JOHNSON  2,324,508
MILITARY VEHICLE BODY
Filed March 21, 1942  3 Sheets-Sheet 2
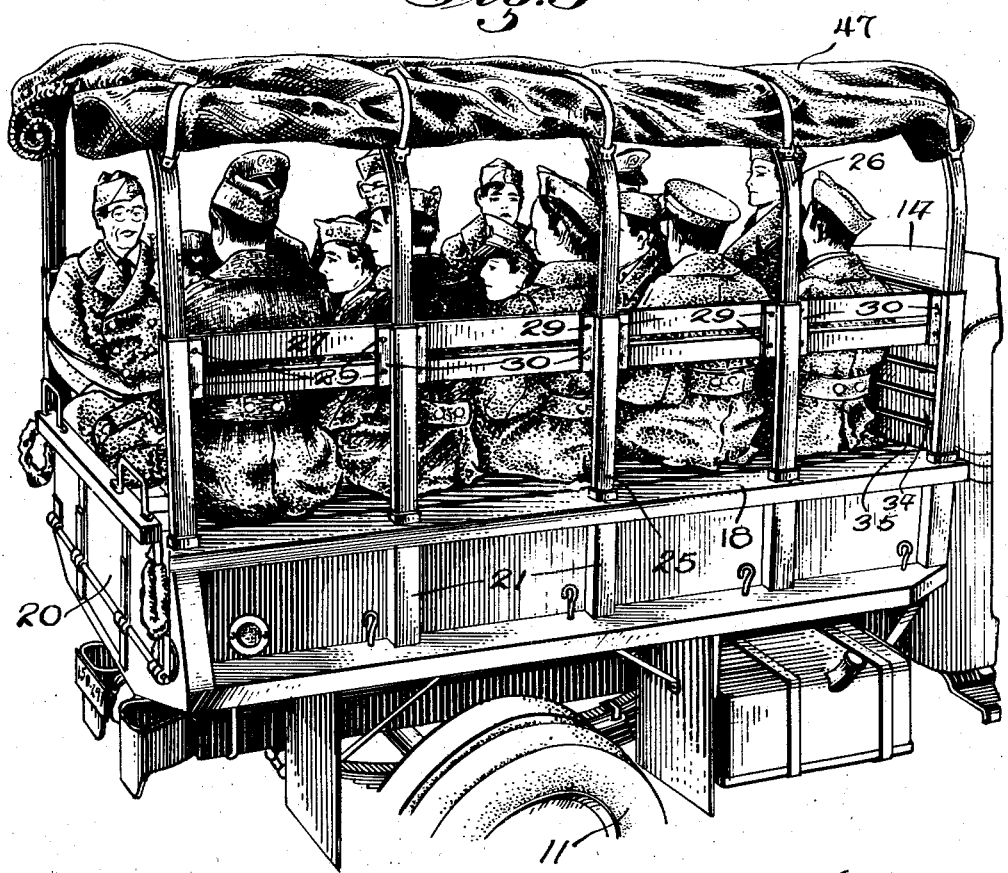
INVENTOR.
William B. Johnson
BY
L. F. Hammand
ATTorney July 20, 1943.  W. B. JOHNSON  2,324,508
MILITARY VEHICLE BODY
Filed March 21, 1942.  3 Sheets-Sheet 3

INVENTOR.
William B. Johnson
BY
L. F. Hammand
ATTORNEY

Patented July 20, 1943

2,324,508

UNITED STATES PATENT OFFICE 2,324,508

MILITARY VEHICLE BODY

William B. Johnson, United States Army, Baltimore, Md.

Application March 21, 1942, Serial No. 435,697

3 Claims. (Cl. 296—36)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to motor vehicles and more particularly to a novel and improved motor vehicle body designed and constructed so that one standard type of motor vehicle may be easily and simply converted into any one of several body types, each especially fitted to a different type of duty.

In considering the present invention, it should be remembered that a large number of motor vehicles are required in any modern military organization, and that these may be of any of several types; for example, vehicles having cargo bodies, stake bodies, bodies arranged for use as open type troop carriers or covered troop transports. There is also a need for truck bodies of sufficient height to permit full standing room in the interior of the vehicle when the vehicle is to be used as an operating unit, such as a field kitchen.

In considering the present invention, it should be remembered that although each individual unit of the military organization has a specific number of vehicles, yet there may be certain times in which they require a large number of cargo bodies, for example, and relatively few stake bodies or troop transports; while at other times and under other circumstances large numbers of troop carriers will be required, and cargo bodies will not be so urgently needed. From the above, it will be apparent that great advantages may be gained by providing a vehicle so constructed and arranged that each unit may be readily and instantly converted from one type of body to another in order that sufficiently large numbers of vehicles of any type may be made available on demand and so that when the large number of vehicles of one type that are temporarily needed are no longer in demand, the vehicles may be reconverted into other forms.

The present invention accomplishes this result by the provision of a motor vehicle having as its basic structure a large, flat cargo body equipped with low side walls and a tailgate at the rear end of the vehicle. The vehicle body is provided with stake sockets, however, and a novel and improved side assembly is arranged to be carried in the stake sockets in order to provide a stake type body while the side panels are so arranged that certain of the rails may be folded downwardly into the position of seats to convert the vehicle into a troop carrier. The panel assemblies are each arranged to include tubular telescoping vertical sleeves, arranged to be mounted in the stake sockets of the truck and to receive the lower ends of the top bows of the vehicle in telescoping arrangement, so that the bows may be moved well downwardly in the tubular mounting sleeves to maintain the minimum silhouette of the vehicle; or may be telescoped upwardly to a relatively high position to provide standing room inside of the vehicle body.

Figure 5:
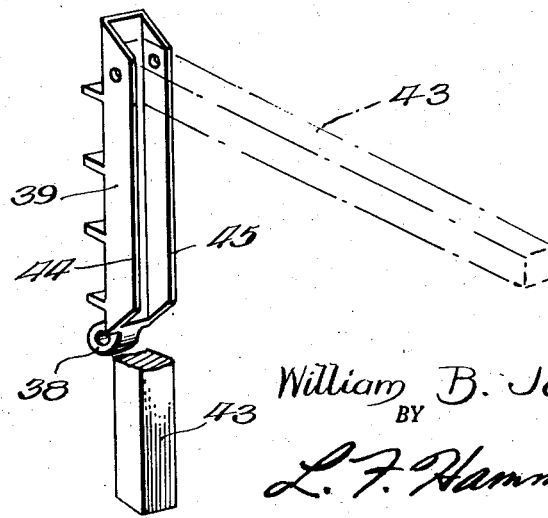

Referring now more particularly to the drawings,

Fig. 1 is a perspective view of the basic structure of the present preferred embodiment of this invention, Fig. 2 is a rear perspective view of the view illustrated in Fig. 1 with the side assemblies in place, the left side assembly being in position for use as a stake body and the right side being illustrated in position which it assumes when the vehicle is used as an open troop carrier, Fig. 3 is a side perspective view of the vehicle, all parts being in the positions they assume when used as a covered troop carrier with the cover in raised position, Fig. 4 is a perspective view of the vehicle, all parts being shown in the positions they assume when the vehicle is to be used as a field kitchen for the troops, Fig. 5 is a detail perspective view of the hinged seat supporting channel and racks, partly broken away, Fig. 6 is a detail sectional view through one of the telescoping tubular side sleeves, and Fig. 7 is a fragmental detail plan sectional view of the left rear corner of the vehicle body, the parts being shown in the position of a troop transport or carrier.

Referring now more particularly to the drawings, the basic vehicle structure comprises rear wheels 11, front wheels 12, motor and hood 13, driver's cab 14 and cargo body 15. The body 15 includes a wide, flat floor 16 with relatively low side walls 17 and 18, front wall 19, and tailgate 20 at the rear of the vehicle. The body 15 is also provided with five stake sockets 21 on each of the side walls 17 and 18 and similar sockets on the front wall 19. Each of the stake sockets 21 consists of a rectangular cavity 22 extending from the upper rail of the side walls downwardly to the level of the floor 16 of the truck body. The stake sockets 21 are adapted to receive and support side extension assemblies on both sides and the front of the vehicle body in order to convert the vehicle into a stake body, and the side extensions are each of a novel and practical mechanical design, so arranged that the vehicle may readily be converted into a troop carrier, with a single troop seat extending the full length of the vehicle on both sides of the body.

The side assemblies each include plurality of vertical supporting sleeves 25 each adapted to be received in one of the stake sockets 21 and to extend downwardly the full depth of the cavities 22. These supporting sleeves, or standards 25 are preferably rectangular in cross-section (see Fig. 7) and are formed of relatively thin sheet metal so that they include a hollow rectangular socket arranged for telescoping engagement with one of the bows 26 of the vehicle top for purposes to be described hereinafter.

The vertical supporting sleeves 25 support a pair of relatively rigid top rails 27 and 28 which are secured to the supports 25 by any convenient means, as, for example, by the screws or rivets 29 extending through the flanges 30 at the upper end of the sleeves. These top rails 27 and 28 are stationarily mounted with respect to the supporting sleeves 25. Lower rails 32, 33, 34 and 35 are positioned below the top rails and all these are hingedly mounted with respect to the supporting sleeves so that the entire group of rails 32, 33, 34 and 35 may be swung downwardly to assume a horizontal position along the inner side of the truck where they will act as a troop seat (see Fig. 2). The vertical supporting sleeve 25 is provided with a collar 36 of thin metal to support the seat rails. These are formed in a generally rectangular shape to surround the sleeve 25 as shown in Fig. 7 and the collar 36 is arranged to include supporting means for a pivot 37. The pivot 37 extends through an opening 38 in a seat supporting channel 39 to which the rails 32, 33, 34 and 35 are secured. The channel member 39 also includes a supporting pivot 42 at its upper end interconnecting the end of the channel to a supporting leg 43. The leg 43 is of proper dimensions to fit snugly between the side flanges 44 and 45 of the channel 39 so that when the said rail assembly is lifted into vertical position, the leg 43 will lie very close to the surface of the side walls 18 and 19 of the vehicle and its upper portion will be received entirely within the channel 39.

It should be particularly noted that when the said rail assembly is lifted to vertical position, the rails 32, 33, 34 and 35 lie in exactly the same plane as the rails 27 and 28 and thus cooperate with the stationary rails to define a highly satisfactory stake type body, and that since the supporting racks 43 are housed wholly within the channels 39, they require very little space and permit the unobstructed use of the full cubic capacity of the truck.

When the vehicle is to be used as a troop carrier, it is only necessary to pivot the rail assembly about the pivots 38 to lower the rails 32, 33, 34 and 35 into approximately horizontal position, where they will be supported by the leg 43, which assumes a position in the lower corner of the vehicle body between the floor of the truck and the surface of the side wall. With the seat in lowered position, the top rails are spaced above the seat rails so that they cooperate to form a back rest for the seat.

The vehicle is provided with a canvas cover 47 supported by the bows 26 and while it is regarded as necessary that this cover, and, of course, the bows, be so arranged that it can be lifted to the position illustrated in Fig. 4 to provide unobstructed headroom and permit soldiers to stand in the vehicle, as is necessary, for example, when the vehicle is provided with a pair of field ranges 48 and used as a field kitchen for troops, it is also absolutely essential that some satisfactory arrangement be made whereby the top of the vehicle may be lowered to a point only slightly higher than the heads of the soldiers when seated on the troop seats, in order that the overall silhouette of the vehicle can be reduced to a minimum when the vehicle is used for the transportation of troops under combat conditions, when it may be a target for enemy gunfire. This is accomplished in the present invention by the design of the vertical rail supporting standards or sleeves 25. These are formed of relatively thin sheet metal to provide a hollow interior extending the full height of the sleeve, and each is adapted to receive the lower end of one of the bows 26. The construction and arrangement is such that the lower end of each of the bows 26 may be telescoped into the sleeve 25 sufficiently to receive ample support when positioned in their highest position (such as illustrated in Fig. 4), and they may be moved downwardly from this position any distance desirable to reduce the silhouette of the truck. The only limit to the downward movement will, of course, be established by the lower end of the bow 26 which will not move below the level of the floor 16 of the truck.

From the foregoing description, it should be apparent that the principles of the present invention permit great flexibility of operation in Army vehicles and gives each vehicle greater usefulness since it provides for the conversion of any one type of vehicle, by the use of a very simple, inexpensive, and highly convenient side rail assembly.

The present invention overcomes the difficulties inherently present in prior attempts to provide folding side seats in convertible vehicles in that the construction and arrangement are such the said rails move into exact alignment below the stationary rails and in the same plane, so that all of the available space within the truck may be utilized.

Further, the novel arrangement of the stake sockets 21, tubular supporting sleeves 25, and bows 26 is such that the supporting sleeve may telescope entirely into the stake socket and that the bows may not only telescope into the sleeves but may be moved downwardly until the lower end of the bow telescopes into the stake socket itself in order to reduce the silhouette of the vehicle.

The present form of the invention is regarded as a preferred embodiment at the present time, and it has been designed for and adopted by the United States Army as the most practical arrangement for the purpose thus far devised. It is believed, however, that notwithstanding the fact that it has been designed primarily from a military viewpoint that its utility is not strictly limited to military vehicles but extends to civil and commercial vehicles as well. It is also believed that the present form of the invention is capable of numerous modifications and rearrangements of structures without departing from the scope of the inventive spirit, and it is therefore requested that the invention be regarded as limited only by the limitations of the appended claims in view of the prior art.

Having thus described my invention, I claim:

1. In a motor vehicle body including a relatively wide, flat floor and low side walls, the combination of a plurality of stake sockets disposed in rows adjacent the opposite sides of the vehicle floor and positioned immediately outside of, and on the outside face of, the side walls; a plurality of removable, generally vertical, supporting sleeves adapted to be telescoped into said supporting stake sockets, a plurality of the supporting sleeves being joined by side rails permanently secured to said supporting sleeves and thus arranged in groups capable of being inserted in or removed from the aforementioned stake sockets as a unit; the side rails interconnecting said supporting sleeves being permanently mounted adjacent the upper ends of the sleeves and in a position substantially above the extreme upper edge of the vehicle side wall; said side rails also being positioned on the inner faces of the supporting sleeves so as to lie directly above the upper edge of the side wall of the vehicle; pivots associated with said sleeves substantially above the floor of the vehicle and above the upper edge of the vehicle side wall; a seat support mounted on each of said pivots, said supports being arranged to pivot between a vertical position and a horizontal position; and a plurality of seat rails extending between and secured to said supports, said seat rails being secured on the upper side of the supports, so that when the supports are in horizontal position the seat rails will present a continuous, smooth, uninterrupted seat surface, and when the supports are shifted to vertical position the seat rails will lie above the side wall of the vehicle below the side rails and in the exact plane of the side wall and side rails.

2. In a motor vehicle body including a relatively wide, flat floor, the combination of a plurality of stake sockets disposed in rows adjacent the opposite sides of the vehicle floor and a plurality of removable supporting sleeves adapted to be telescoped into said stake sockets; a plurality of the supporting sleeves being joined by side rails permanently secured to said supporting sleeves and thus arranged in groups capable of being inserted in or removed from the aforementioned stake sockets as a unit; the side rails interconnecting said supporting sleeves being permanently mounted adjacent the upper ends of the sleeves and positioned on the inner faces of the supporting sleeves; a pivot associated with each of said sleeves substantially above the floor of the vehicle; a seat supporting channel mounted on and adapted to extend horizontally from each of said pivots, each channel including an upper mounting surface and a pair of reinforcing flanges extending substantially the entire length of the channel on the opposite edges of the mounting surface and at right angles thereto to reinforce the channel structure and to provide a U-shaped recess in the lower surface of the channel; said channels being arranged to pivot between said horizontal position and a vertical position wherein the flanges of said channel extend inwardly into the vehicle body; a pivot extending between the reinforcing flanges of each channel at a point remote from the first mentioned pivot; a supporting leg carried by said second pivot and positioned between the reinforcing flanges of the channel, together with a plurality of seat rails extending between and secured to said channel members; said seat rails being secured on the upper side of the channel opposite the reinforcing flanges, so that when the channels are in horizontal position the seat rails will present a continuous, smooth, uninterrupted seat surface, and when the channels are shifted to vertical position the supporting legs will lie between and be protected by the reinforcing flanges of the channels.

3. In a motor vehicle body including a relatively wide, flat floor, the combination of a plurality of stake sockets disposed in rows adjacent the opposite sides of the vehicle floor and a plurality of removable supporting sleeves adapted to be telescoped into said stake sockets; a plurality of the supporting sleeves being joined by side rails permanently secured to said supporting sleeves and thus arranged in groups capable of being inserted in or removed from the aforementioned stake sockets as a unit; the side rails interconnecting said supporting sleeves being permanently mounted on the inner faces of the supporting sleeves so as to provide a smooth, uninterrupted back rest rail along the side of the vehicle; a pivot associated with each of said sleeves substantially above the floor of the vehicle; a seat support mounted on said pivot, said support being arranged to pivot between a vertical position and a horizontal position; and a plurality of seat rails extending between and secured to a plurality of said supports, said seat rails being secured on the upper side of the supports, so that when the supports are in horizontal position the seat rails will present a continuous, smooth, uninterrupted seat surface.

WILLIAM B. JOHNSON.